(12) United States Patent
Wang

(10) Patent No.: US 8,870,142 B2
(45) Date of Patent: Oct. 28, 2014

(54) SUPPORT DEVICE WITH INCLINATION ADJUSTMENT FUNCTION

(71) Applicants: Fu Tai Hua Industry (Shenzhen) Co., Ltd., Shenzhen (CN); Hon Hai Precision Industry Co., Ltd., New Taipei (TW)

(72) Inventor: Hua-Yong Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/733,140

(22) Filed: Jan. 2, 2013

(65) Prior Publication Data

US 2013/0240686 A1   Sep. 19, 2013

(30) Foreign Application Priority Data

Mar. 14, 2012   (CN) .......................... 2012 1 0066677

(51) Int. Cl.
*E05D 11/08* (2006.01)
*F16M 11/10* (2006.01)
*F16M 13/02* (2006.01)

(52) U.S. Cl.
CPC ............. *F16M 13/022* (2013.01); *F16M 11/10* (2013.01); *F16M 2200/024* (2013.01); *F16M 13/02* (2013.01)
USPC .......................................... 248/284.1; 16/324

(58) Field of Classification Search
USPC ........... 248/122.1, 292.13, 284.1, 291.1, 919, 248/921, 922, 923; 16/333, 334, 335, 342
See application file for complete search history.

(56) References Cited

U.S. PATENT DOCUMENTS

| | | | | |
|---|---|---|---|---|
| 6,018,847 | A * | 2/2000 | Lu ................................... | 16/337 |
| 6,671,928 | B2 * | 1/2004 | Huang ............................ | 16/340 |
| 7,257,861 | B2 * | 8/2007 | Lee et al. ........................ | 16/338 |
| 7,673,844 | B2 * | 3/2010 | Zhang et al. ............... | 248/372.1 |
| 8,046,874 | B2 * | 11/2011 | Cheng ............................. | 16/324 |
| 8,307,506 | B2 * | 11/2012 | Cheng ............................. | 16/324 |
| 2003/0122046 | A1 * | 7/2003 | Huong ....................... | 248/291.1 |

* cited by examiner

*Primary Examiner* — Steven Marsh
(74) *Attorney, Agent, or Firm* — Novak Druce Connolly Bove + Quigg LLP

(57) ABSTRACT

A support device for supporting an object is provided. The support device includes a pair of bases spaced from each other; a position adjustor bridging on and movably fixing between the pair of bases, and a connecting unit mounted to the position adjustor for connecting the object. The position adjustor is configured for rotating in related to the bases. The connecting unit is configured for rotating together with the position adjustor to adjust an inclination of the object.

14 Claims, 5 Drawing Sheets

SUPPORT DEVICE WITH INCLINATION ADJUSTMENT FUNCTION

BACKGROUND

1. Technical Field

The present disclosure relates to support devices, and more particularly, to a support device with inclination adjusting function.

2. Description of Related Art

Support devices are widely used to support display devices such as liquid crystal display (LCD) monitors or LCD televisions (TVs). However, in a typically support device it is inconvenient for a user to adjust an inclination angle of the supported display devices.

Therefore, it is desirable to provide a support device, which can overcome the above-mentioned problems.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Embodiments of the present disclosure will now be described in detail, with reference to the accompanying drawings.

Figure 1:
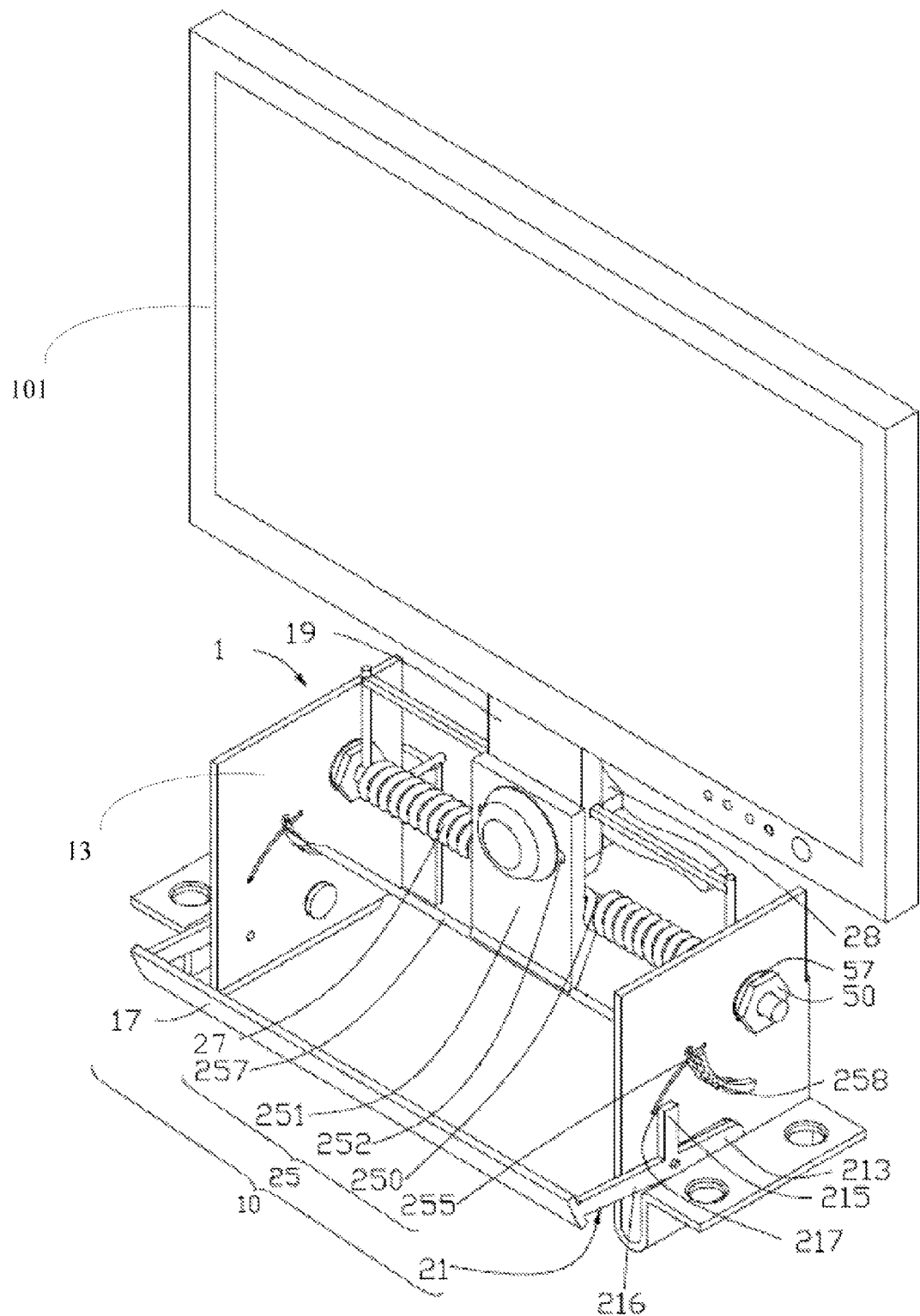
FIG. 1 is an assembled, perspective view of a support device supporting a display device, according to an exemplary embodiment.
Figure 2:
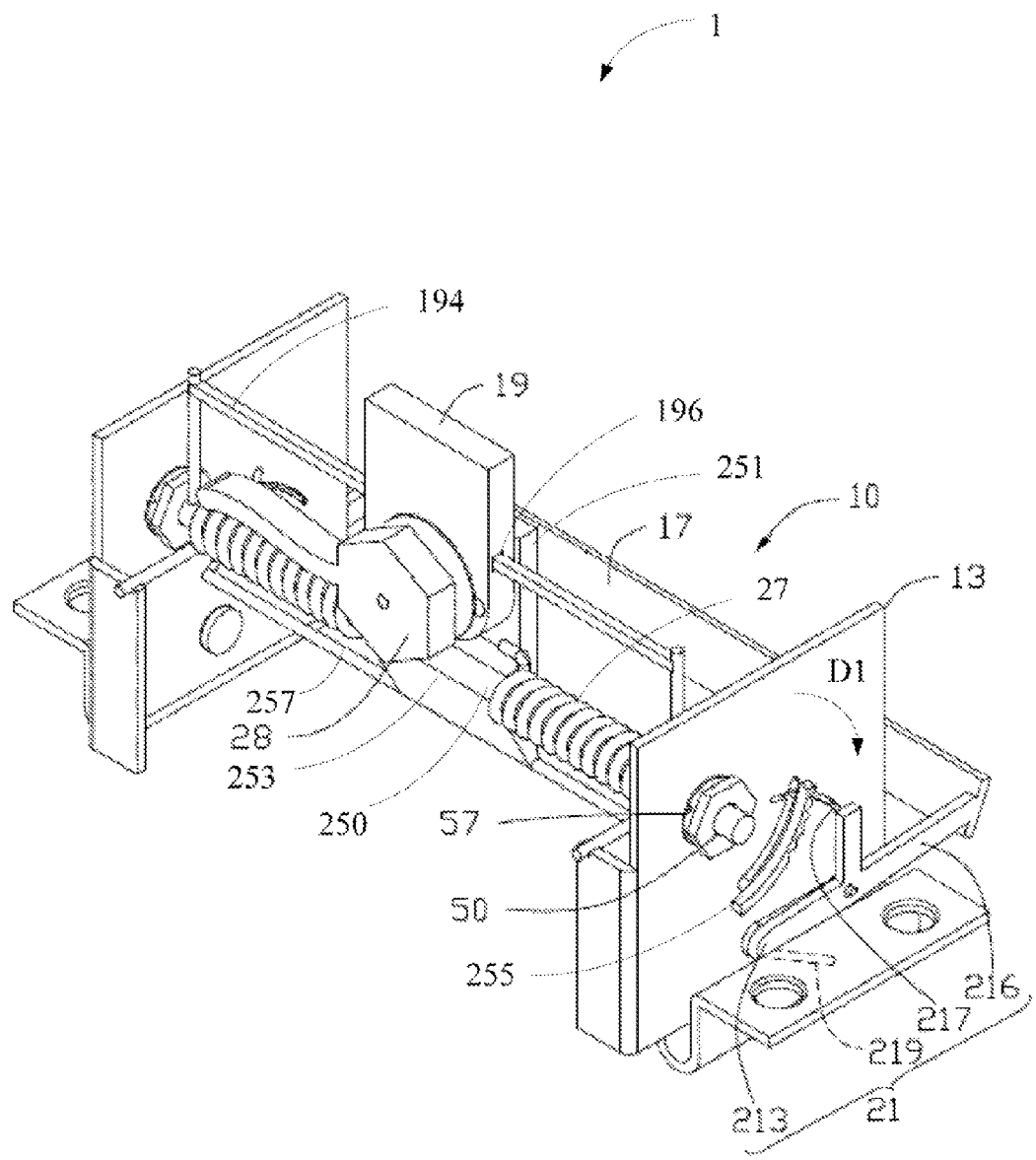
FIG. 2 is an assembled, perspective view of a support device observed from another view angle.
Figure 3:
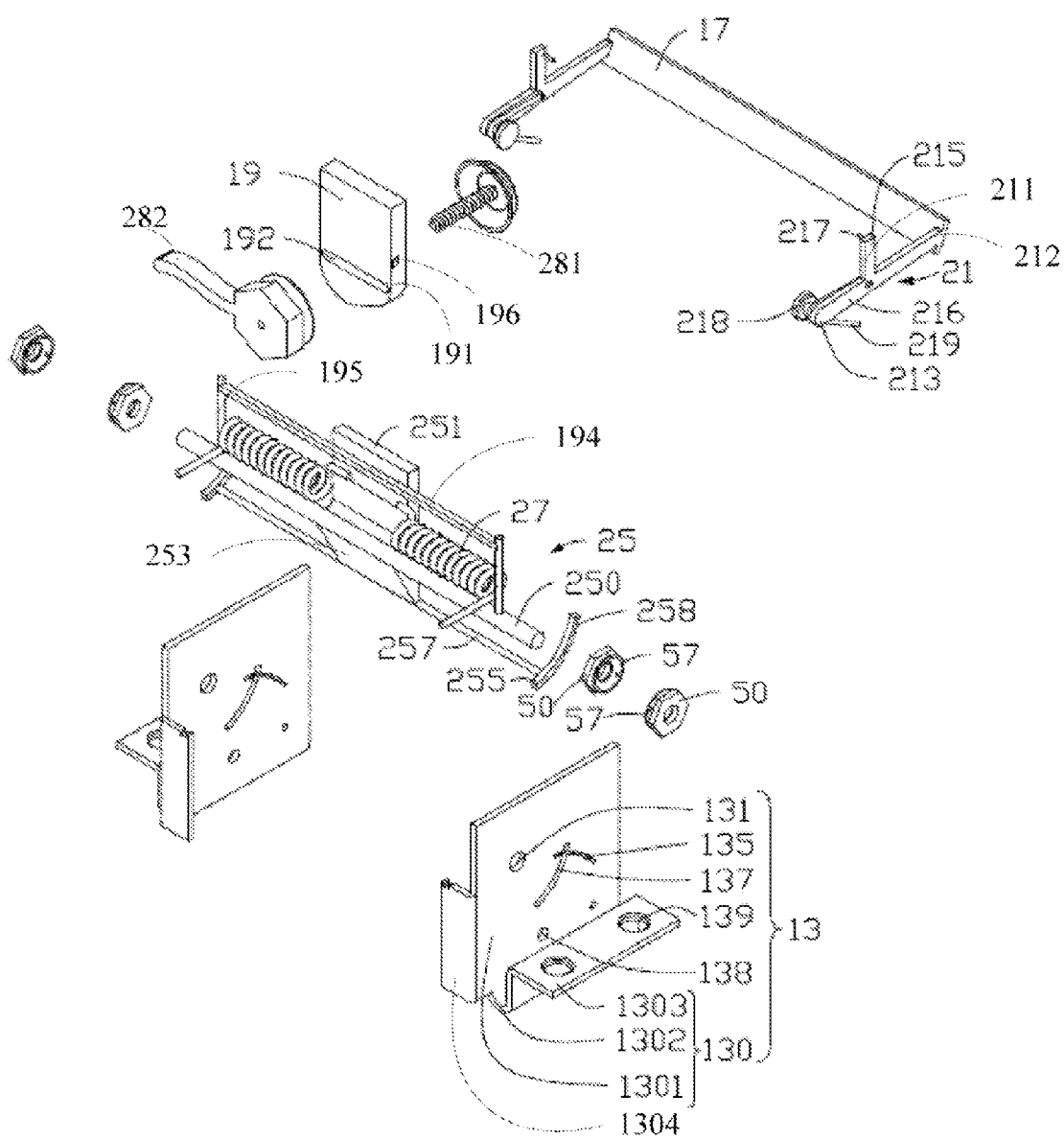
FIG. 3 is an exploded, perspective view of the support device of FIG. 1.

Referring to FIGS. 1-3, a support device 1 for supporting a display device 101, according to one embodiment is shown. The support device 1 is configured for supporting a display device 101 and is convenient for adjusting an inclination of the display device 101. In alternative embodiments, the support device 1 may also be used for supporting other equipment, which is needed to adjust view angle or inclination angle.

The support device 1 includes a pair of bases 13, a position adjustor 10 and a connecting unit 19. The bases 13 are used to mount the position adjustor 10. The position adjustor 10 bridges on and is fastened to the pair of bases 13. The connecting unit 19 is slidably mounted on the position adjustor 10 and configured to move along an extending direction of the position adjustor 10. The display device 101 is directly fastened to the connecting unit 19. In the embodiment, the position adjustor 10 may rotate according to the bases 13, thereby rotating the display device 101 to adjust an inclination of the display device 101.

The connecting unit 19 defines a fixing through hole 196, and a first strip-shaped through hole 192 as shown in FIG. 3.

The fixing through hole 196 extends through two opposite narrow side walls 191 of the connecting unit 19.

FIG. 3 shows that each base 13 includes a base support 130. In the embodiment, the base support 130 includes a fastening board 1303, a sidewall 1301, a blocking wall 1304, and a U-shaped bottom 1302 having two parallel ends (not labeled). An end of the U-shaped bottom 1302 is connected and coplanar to the sidewall 1301. The other end of the U-shaped bottom 1302 is perpendicularly connected to the fastening board 1303. That is, the fastening board 1303 is substantially perpendicular to the sidewall 1301 in one embodiment. The blocking wall 1304 perpendicularly extends from an edge of the sidewall 1301 away from the fastening board 1303.

The fastening board 1303 defines two securing holes 139 at its opposite sides which are configured for securing the fastening board 1303 to the external supporting surface with screws (not shown).

Each sidewall 1301 defines a first pivotal hole 131, a first sliding groove 135, a second sliding groove 137, and a second pivotal hole 138. Both the first and the second sliding grooves 135, 137 are passed through the sidewall 1301 in a thickness direction of each sidewall 1301. The first sliding groove 135 and the second sliding groove 137 cross and communicate with each other near their ends. In the embodiment, each sidewall 1301 is square and an intersection of the first and the second sliding grooves 135, 137 are close to a central vicinity of the sidewall 1301. The first pivotal hole 131 is the center of a circle that the second sliding groove 137 is an arc of. The first pivotal hole 131 is located near a top corner of each sidewall 1301. The second pivotal hole 138 is the center of a circle that the first sliding groove 135 is an arc of. The second pivotal hole 138 is located near the fastening board 1303 and under both the first and the second sliding grooves 135, 137. Both the first and the second sliding grooves 135, 137 are narrow and arch-shaped.

In an alternative embodiment, the first sliding groove 135 and the second sliding groove 137 may also be arranged at opposite sides of the sidewall 1301. In other alternative embodiments, the U-shaped bottom 1302 may be omitted. Under this condition, the fastening board 1303 may extend directly and perpendicularly from the sidewall 1301 away from the blocking wall 1304.

The position adjustor 10 includes a rotatable unit 25 and a position limiter 21. The rotatable unit 25 includes a sliding rail 194, a blocking panel 251, a pivotal pole 250, a connecting pole 257, a pair of blocking sticks 255, and a spring 27.

Figure 4:
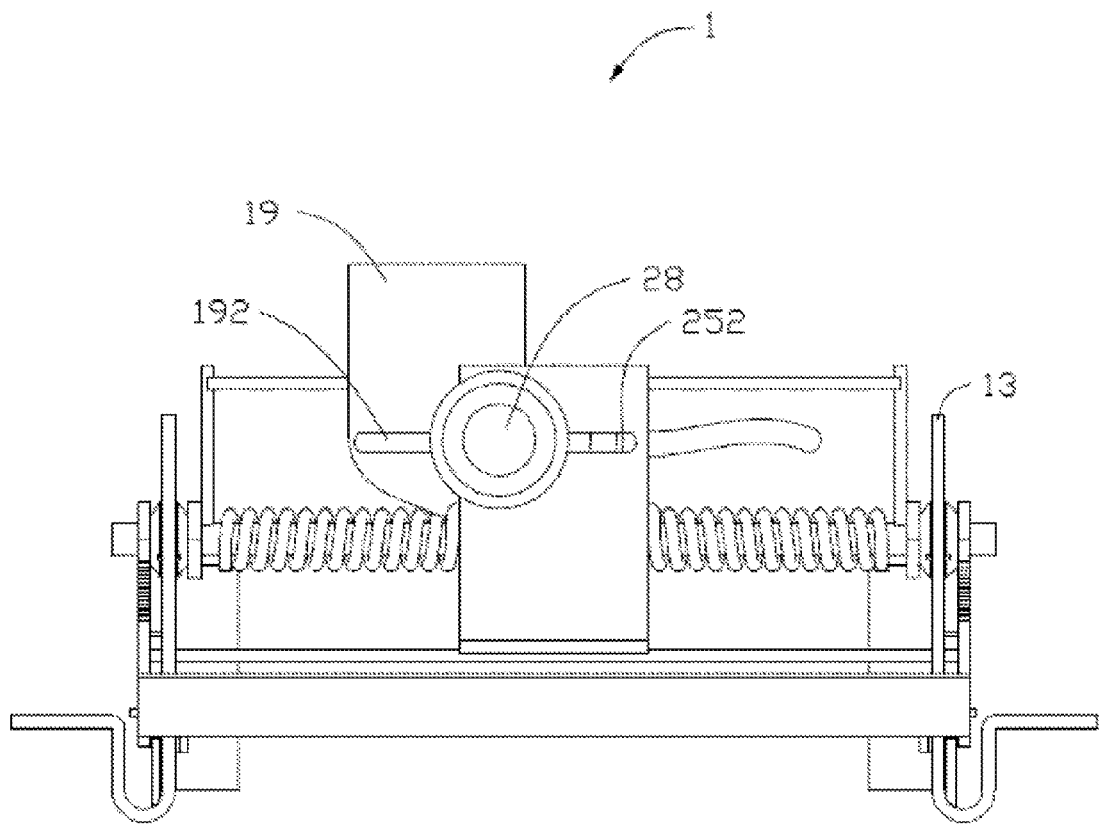
FIG. 4 is an assembled, side view of the support device of FIG. 2 showing a horizontal adjusting status of the support device.

The blocking panel 251 is substantially square and a bottom edge of the blocking panel 251 is arranged to be parallel to the pivotal pole 250. A triangular prism-shaped protrusion 253 extends from the middle part of the blocking panel 251. An edge of the triangular prism-shaped protrusion 253 is parallel to and connected to a central part of the pivotal pole 250. The blocking panel 251 further defines a second strip-shaped through hole 252, as shown in FIG. 4, parallel to the extending direction of the pivotal pole 250. In this embodiment, the first strip-shaped through hole 192 is also parallel to the extending direction of the pivotal pole 250. The first strip-shaped through hole 192 and the second strip-shaped through hole 252 align with each other and may have the same width.

The connecting pole 257 is parallel to the pivotal pole 250. A middle part of the connecting pole 257 is connected to the bottom edge of the blocking panel 251.

The blocking sticks 255 are arch-shaped. Each blocking stick 255 includes a plurality of blocking notches 258, as shown in FIG. 3, defined on an outer surface facing to the position limiter 21. In this embodiment, the blocking sticks 255 has an extending curve similar to the second sliding groove 137 and arranged parallel to the second sliding groove 137.

The position limiter 21 includes a pair of lever units 216, a pair of blocking rods 211, a pair of elastic units 219, and a holding bar 17.

The pair of lever units 216 are fastened on a same surface of the holding bar 17 and are perpendicularly connected to two opposite ends of the holding bar 17 to form a U-shaped handle. Each lever unit 216 includes a first end 212 connected to the holding bar 17 and a second end 213.

The elastic unit 219 is a V-shaped spring including a first terminal and a second terminal. The first terminal is fastened to the second end 213 of the lever unit 219. The second terminal freely extends from the second end of the lever unit 219 to resist the U-shaped bottom 1302. In alternative embodiments, the elastic unit 219 may be a twist spring fastened to the second end 213 of the lever unit 216.

Each blocking rod 211 perpendicularly extends from the middle part of each lever unit 21. The blocking rod 211 includes a sliding arm 217 perpendicularly extending from the blocking end 215. The blocking rod 211 defines a sharp blocking end 215 at its top corresponding to the notch 258.

In assembly, to support the display device 101, the pair of bases 13 is positioned or mounted on an external supporting surface, such as a top surface of a desk. That is, the pair of bases 13 is spaced from each other at an interval and arranged to let the two sidewalls 1301 face each other.

The pivotal pole 250 with at least one spring 27 being sleeved thereon is arranged between the pair of sidewall 1301. Two ends of the pivotal pole 250 pass through the first pivotal holes 131 and are configured to rotate in the first pivotal holes 131. The two exposed ends of the pivotal pole 250 are threaded and nuts 50 are screwed unto them. One end of the spring 27 is secured by the blocking wall 1304. The blocking panel 251 secures the other end of the spring 27.

At the same time, the two ends of the connecting pole 257 pass through the second sliding grooves 137 and slide along the second sliding grooves 137. Two exposed ends of the connecting pole 257 are perpendicularly fastened to the pair of blocking sticks 255. Such that, the pair of blocking sticks 255 are positioned adjacent outside surfaces of the sidewall 1301 and the blocking notches 258 face the U-shaped bottom 1302.

The two sliding arms 217 of the pair of position limiters 21 are correspondingly received in the first sliding grooves 135 and slide along the first sliding grooves 135. After that, the second ends 213 of the lever units 216 are rotatably fastened to the sidewall 1301 with a fixing element 218 passing through the second pivotal hole 138 and connecting each second end 213 of the lever unit 216. Under this condition, the second terminal of the elastic unit 219 extends towards the U-shaped bottom 1302 and resists against the U-shaped bottom 1302. The sharp blocking end 215 of the blocking rod 211 is correspondingly received in and resists against one of the plurality of blocking notches 258.

The sliding rail 194 is arranged parallel to the pivotal pole 250 and passes through the fixing through hole 196 of the connecting unit 19. Two ends of the sliding rail 194 are correspondingly fastened to the pivotal pole 250 by two fixing rods 195 thereby defining a square frame for securing the connecting unit 19. In the embodiment, a fixing unit 28 which includes screw 281 and a nut 282 is also provided for further fastening of the connecting unit 19 with the blocking panel 251. The screw 281 correspondingly passes through the first and the second strip-shaped through holes 252, 192 to thread into the nut 282.

FIG. 4 is an assembled, side view of the support device 1 of FIG. 2 showing a horizontal adjustment status of the support device 1. In operation, when a horizontal position of the display device 101 is needed to be adjusted, the nut 282 is partly unscrewed from the screw 281. Thus, the connecting unit 19 together with the display device 101 may move along the sliding rail 194 to adjust a horizontal position of the connecting unit 19. When the nut 282 is tightly screwed onto the screw 281, the connecting unit 19 together with the display device 101 is tightly fastened to the blocking panel 251. The first and the second first strip-shaped through holes 252, 192 cooperated with the screw 281 are configured to limit a horizontal movement distance of the connecting unit 19 along the sliding rail 194 in related to the blocking panel 251.

Figure 5:
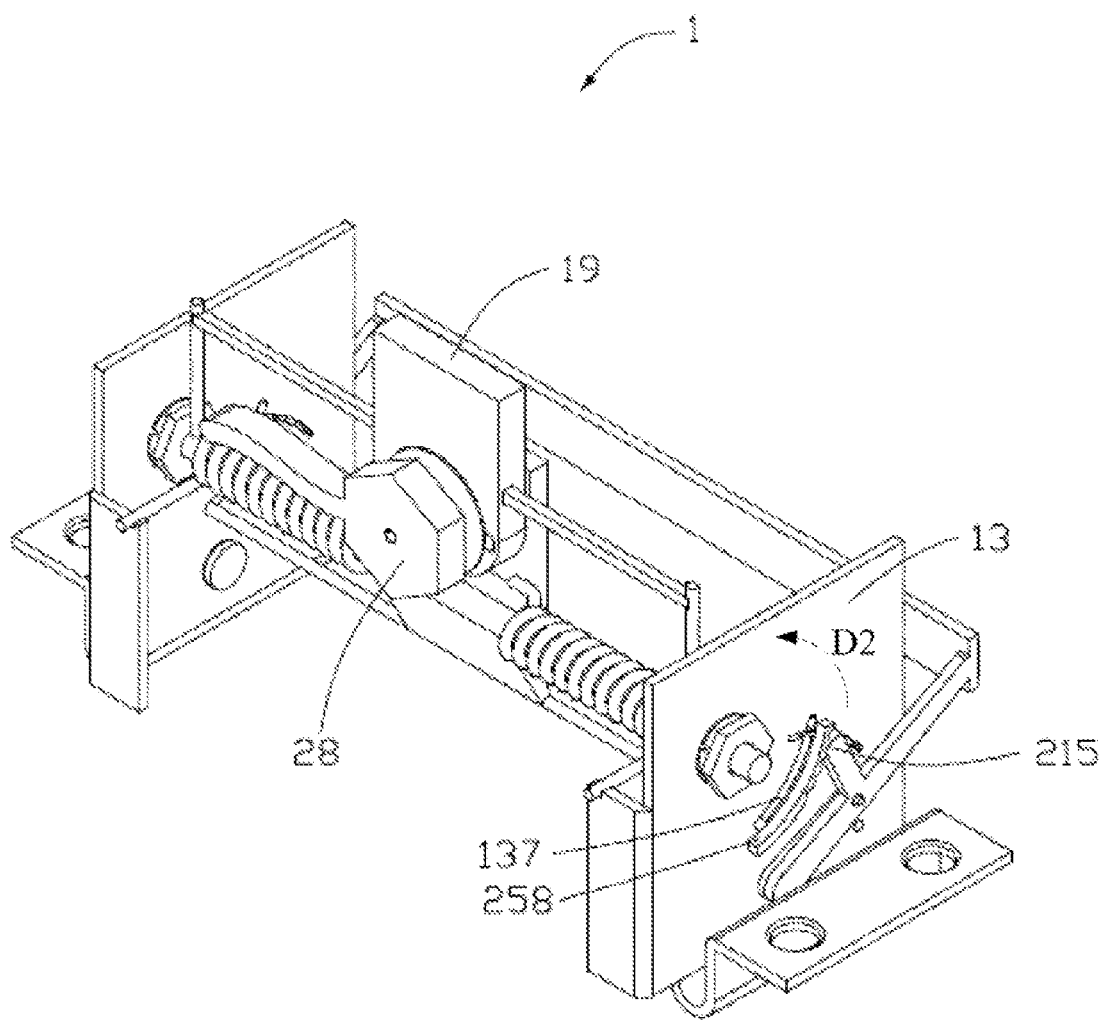
FIG. 5 is an assembled, perspective view of the support device of FIG. 2 showing a rotatably adjusting status of the support device.

FIG. 5 is an assembled, perspective view of the support device 1 of FIG. 2 showing a rotatably adjusting status of the support device 1. When an inclination angle of the display device 101 needs to be adjusted, the position limiter 21 is pulled down by a user and rotated around the through hole 138 along a first direction D1 as shown in FIG. 2. Therefore, the blocking end 215 is detached from the correspondingly engaged blocking notch 258 of the blocking stick 255. At the same time, the second terminal of the elastic unit 219 is twisted or is retracted by the U-shaped bottom 1302 to store elastic potential energy.

Under this condition, the position adjustor 10 may freely rotate according to the bases 13. Thus, a user may pull the display device 101 to freely rotate the display device 101 around the pivotal pole 250. When the user determines a desired inclination angle of the display device 101, the position limiter 21 is released by the user and is rotated around the through hole 138 along a second direction D2 as shown in FIG. 5. Under this condition, a restoring elastic force of the second terminal of the elastic unit 219 pulls the blocking end 215 to engage with a corresponding blocking notch 258 again. The engagement of the blocking end 215 and the blocking notch 258 prevent the position adjustor 10 from rotating according to the bases 13, thereby fixing the display device 101 at a desired inclination angle.

In alternative embodiments, the spring 27 may be omitted. The blocking sticks 255 may be fastened at two ends of the pivotal pole 250 instead of being fastened at two ends of connecting pole 257. In further alternative embodiments, a belled pad 50 (see FIG. 3) is provided to sleeve on the ends of the pivotal pole 250 and is sandwiched between the sidewall 1301 and the nuts 50. The belled pad 50 may decrease the friction between the pivotal pole 250 and the sidewall 1301.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A support device for supporting an object, the support device comprising:
　a pair of bases spaced from each other, each base comprising a sidewall defining a first pivotal hole and a second pivotal hole;
　a position adjuster comprising a rotatable unit rotatably fastened to the first pivotal hole and limiting a rotation range of the rotatable unit by a first sliding groove defined in the sidewall and a position limiter rotatably fastened to the second pivotal hole for selectively stopping the rotation of the rotatable unit; wherein the sidewall further defines a second sliding groove to limit a rotation range of the position limiter, the position adjuster movably fastened between the pair of bases, the position adjuster being configured for rotating in relation to the bases; and a connecting unit mounted to the position adjuster for connecting the object, the connecting unit being configured for rotating together with the position adjuster to adjust an inclination of the object.

2. The support device of claim 1, wherein the first and the second sliding grooves are arch-shaped.

3. The support device of claim 2, wherein the first sliding groove and the second sliding groove communicate with each other.

4. The support device of claim 2, wherein the first pivotal hole is a center of a circle that the first sliding groove is arc of, and the second pivotal hole is a center of a circle that the second sliding groove is an arc of.

5. The support device of claim 2, wherein the rotatable unit comprises a pivotal pole and a blocking panel connected to the pivotal pole, two ends of the pivotal pole pass through the first pivotal holes and are fastened by nuts.

6. The support device of claim 5, wherein the connecting unit defines a fixing through hole, the rotatable unit further comprises a sliding rail passing through the fixing through hole to guide a horizontal movement of the connecting unit, two ends of the sliding rail are correspondingly fastened to the pivotal pole by two fixing rods.

7. The support device of claim 6, wherein the connecting unit further defines a first strip-shaped through hole, the blocking panel further defines a second strip-shaped through hole aligned with the first strip-shaped through hole, a fixing unit passes through the first and the second strip-shaped through holes to fix the connecting unit with the blocking panel.

8. The support device of claim 7, wherein when the connecting unit moves along the sliding rail, the first and the second strip-shaped through holes cooperated with the fixing unit limit a movement distance of the connecting unit.

9. The support device of claim 8, wherein each base further comprises a blocking wall perpendicularly extending from an edge of each side wall, the rotatable unit further comprising a spring sleeved on the pivotal pole, one end of the spring is secured by one of the blocking walls, the other end of the spring is secured by the blocking panel.

10. The support device of claim 9, wherein the rotatable unit further comprises a pair of blocking sticks and a connecting pole connected to a bottom side of the blocking panel, two ends of the connecting pole pass through the second sliding grooves and are configured to slide along the first sliding grooves, two exposed ends of the connecting pole are perpendicularly fastened to the pair of blocking sticks.

11. The support device of claim 10, wherein the position limiter comprises a pair of lever units and a holding bar, the pair of lever units are perpendicularly connected to two opposite ends of the holding bar to form a U-shaped handle, each lever unit comprises a first end connected to the holding bar and a second end rotatably fastened to the through hole.

12. The support device of claim 11, wherein each base further comprises a bottom support connected to the sidewall, the position limiter further comprises an elastic unit comprising a first terminal and a second terminal, the first terminal is fastened to the second end of the lever unit, and the second terminal is extended to resist the bottom support.

13. The support device of claim 12, wherein the position limiter further comprises a pair of blocking rods, each blocking rod extends from each lever unit and comprises a blocking end, each blocking stick comprises a plurality of notches correspondingly engaging with the blocking end to prevent the position adjuster from rotating according to the bases.

14. The support device of claim 13, wherein each blocking rod further comprises a sliding arm, the pair of sliding arms are correspondingly received in the second sliding grooves and configured to slide along the second sliding grooves.

* * * * *